United States Patent
Albouyeh et al.

(10) Patent No.: US 9,420,016 B2
(45) Date of Patent: *Aug. 16, 2016

(54) PREDICTING VIEWING ACTIVITY OF A POSTING TO AN ACTIVITY STREAM

(71) Applicant: INTERNATIONAL BUSINESS MACHINES CORPORATION, Armonk, NY (US)

(72) Inventors: Shadi E. Albouyeh, Raleigh, NC (US); Bernadette A. Carter, Raleigh, NC (US); Jeffrey R. Hoy, Southern Pines, NC (US); Stephanie L. Trunzo, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/460,749

(22) Filed: Aug. 15, 2014

(65) Prior Publication Data

US 2015/0188955 A1 Jul. 2, 2015

Related U.S. Application Data

(63) Continuation of application No. 14/146,074, filed on Jan. 2, 2014.

(51) Int. Cl.
*H04L 29/06* (2006.01)
*H04L 29/08* (2006.01)

(52) U.S. Cl.
CPC .............. *H04L 65/403* (2013.01); *H04L 65/60* (2013.01); *H04L 67/22* (2013.01)

(58) Field of Classification Search
CPC ....... H04L 65/60; H04L 65/403; H04L 67/22; H04L 29/06; H04L 29/08; G06N 5/02
USPC ................ 706/12, 46; 709/204, 223–224
See application file for complete search history.

(56) References Cited

U.S. PATENT DOCUMENTS

| | | | |
|---|---|---|---|
| 2006/0224445 | A1 | 10/2006 | Axe et al. |
| 2009/0240771 | A1 | 9/2009 | Capobianco |
| 2011/0246907 | A1 | 10/2011 | Wang et al. |

(Continued)

OTHER PUBLICATIONS

Kong Q. et al., "Predicting User Participation in Social Networking Sites", IEEE, ISI 2013, Jun. 4-7, 2013, Seattle, Washington, USA, pp. 154-156.*

(Continued)

*Primary Examiner* — Stanley K Hill
*Assistant Examiner* — Dave Misir
(74) *Attorney, Agent, or Firm* — Law Office of Jim Boice

(57) ABSTRACT

A method, system and/or computer program product predicts viewing activity of a new posting to an activity stream. A first computer transmits a new posting to an activity stream in a second computer, where the new posting is available to a potential viewer set. Based on identified viewer information about one or more members of the potential viewer set, a prediction is made of viewing activity of the new posting by the potential viewer set. This predicted viewing activity is based on identified viewer information about members of the potential viewer set, and describes a predicted likelihood of the potential viewer set viewing the new posting. The derived predicted viewing activity of the new posting by the potential viewer set is then presented at the first computer.

7 Claims, 4 Drawing Sheets

(56) References Cited

U.S. PATENT DOCUMENTS

| | | | |
|---|---|---|---|
| 2011/0302103 A1* | 12/2011 | Carmel | G06Q 30/0282 705/347 |
| 2012/0166532 A1* | 6/2012 | Juan | G06Q 50/01 709/204 |
| 2013/0013720 A1 | 1/2013 | Huang et al. | |
| 2013/0311408 A1* | 11/2013 | Bagga | G06Q 30/02 706/12 |
| 2013/0325755 A1* | 12/2013 | Arquette | G06N 5/048 706/12 |
| 2014/0088944 A1* | 3/2014 | Natarajan | G06Q 30/02 703/13 |
| 2014/0095606 A1* | 4/2014 | Matus | H04L 67/22 709/204 |
| 2014/0146052 A1* | 5/2014 | Takamura | G06F 13/00 345/440 |
| 2014/0173424 A1* | 6/2014 | Hogeg | H04N 21/47205 715/255 |
| 2015/0052087 A1* | 2/2015 | Srinivasan | G06N 99/005 706/12 |
| 2015/0170294 A1* | 6/2015 | Goyal | G06Q 30/0264 705/14.61 |
| 2015/0172145 A1* | 6/2015 | Skiba | H04L 67/10 709/224 |

OTHER PUBLICATIONS

IBM, "A System for Synchronous Notification and Access in Weblogs", IP.com, IPCOM000133811D, February 9, 2006, pp. 1-3.

* cited by examiner

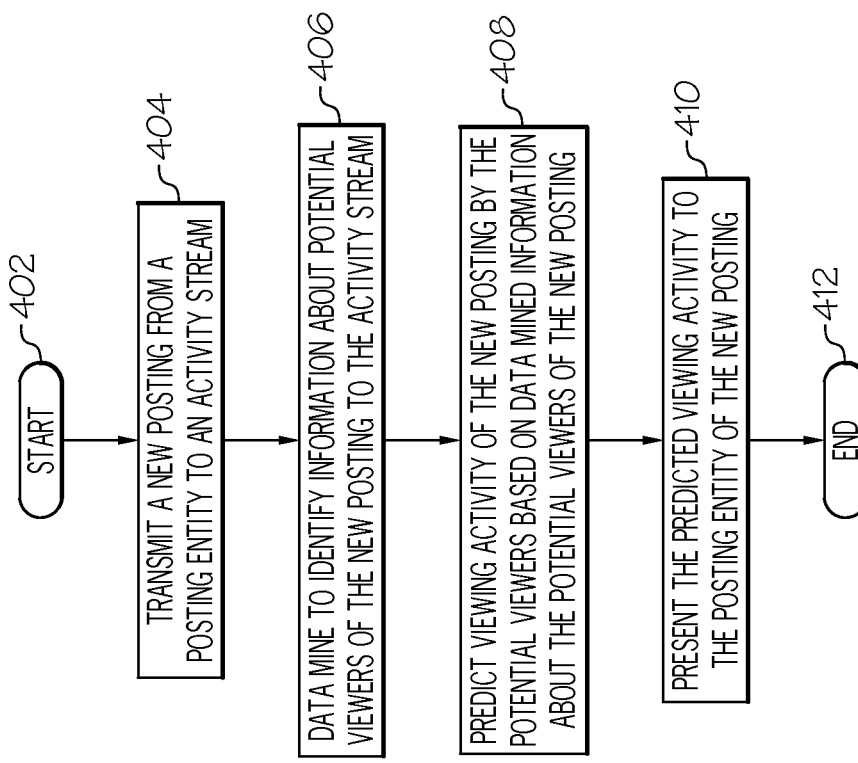

PREDICTING VIEWING ACTIVITY OF A POSTING TO AN ACTIVITY STREAM

BACKGROUND

The present disclosure relates to the field of computers, and specifically to the use of computers when generating and/or updating activity streams. Still more particularly, the present disclosure relates to predicting a likelihood of whether a particular posting to an activity stream will actually be viewed by a particular person or group of persons.

An activity stream is a set of postings about a particular person, subject, topic, context, etc. For example, a user may establish an activity stream, on her webpage, which presents descriptions of activities, comments/opinions, instructions/requests, etc. related to a particular work project. These descriptions/comments/instructions/etc. are known as "postings", and may come from any person who is authorized to post on the activity stream (including users who are not the initial creator/host of the activity stream). The quantity of postings to the activity stream from various users may range from one or two in a single day to hundreds or thousands in a single day.

SUMMARY

A method, system and/or computer program product predicts viewing activity of a new posting to an activity stream. A first computer transmits a new posting to an activity stream in a second computer, where the new posting is available to a potential viewer set. Based on identified viewer information about one or more members of the potential viewer set, a prediction is made of viewing activity of the new posting by the potential viewer set. This predicted viewing activity is based on identified viewer information about members of the potential viewer set, and describes a predicted likelihood of the potential viewer set viewing the new posting. The derived predicted viewing activity of the new posting by the potential viewer set is then presented at the first computer.

BRIEF DESCRIPTION OF THE SEVERAL VIEWS OF THE DRAWINGS

FIG. 4 is a high level flow chart of one or more exemplary steps taken by one or more processors to predict viewing activity of a new posting to an activity stream.

DETAILED DESCRIPTION

Figure 1:
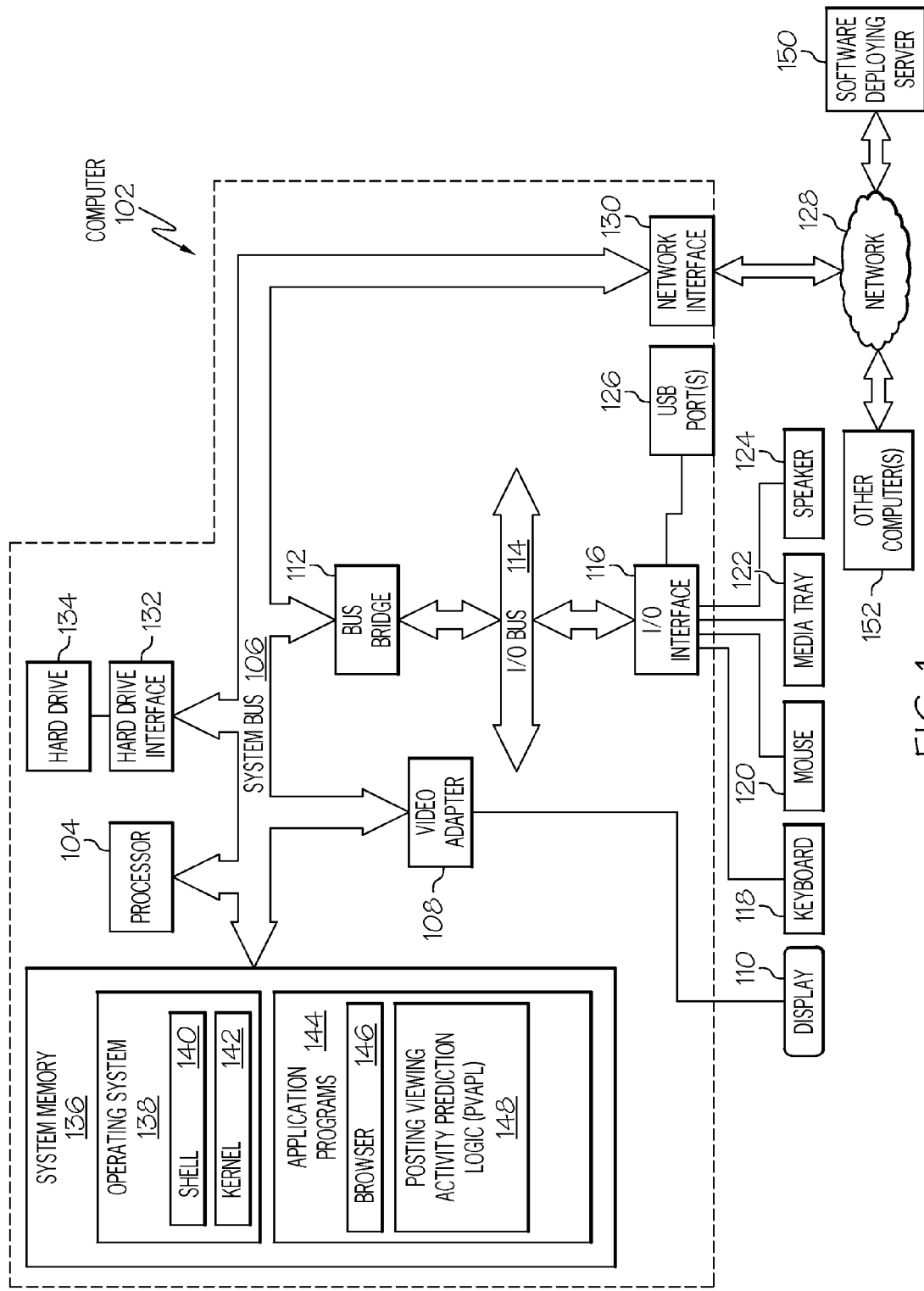
FIG. 1 depicts an exemplary system and network which may be used to implement the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or other computer(s) 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a speaker 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems such as other computer(s) 152.

Application programs 144 in computer 102's system memory (as well as software deploying server 150's system memory) also include a posting viewing activity prediction logic (PVAPL) 148. PVAPL 148 includes code for implementing the processes described below, including those described in FIGS. 2-4. In one embodiment, computer 102 is able to download PVAPL 148 from software deploying server 150, including in an on-demand basis, wherein the code in PVAPL 148 is not downloaded until needed for execution. Note further that, in one embodiment of the present invention, software deploying server 150 performs all of the functions associated with the present invention (including execution of PVAPL 148), thus freeing computer 102 from having to use its own internal computing resources to execute PVAPL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
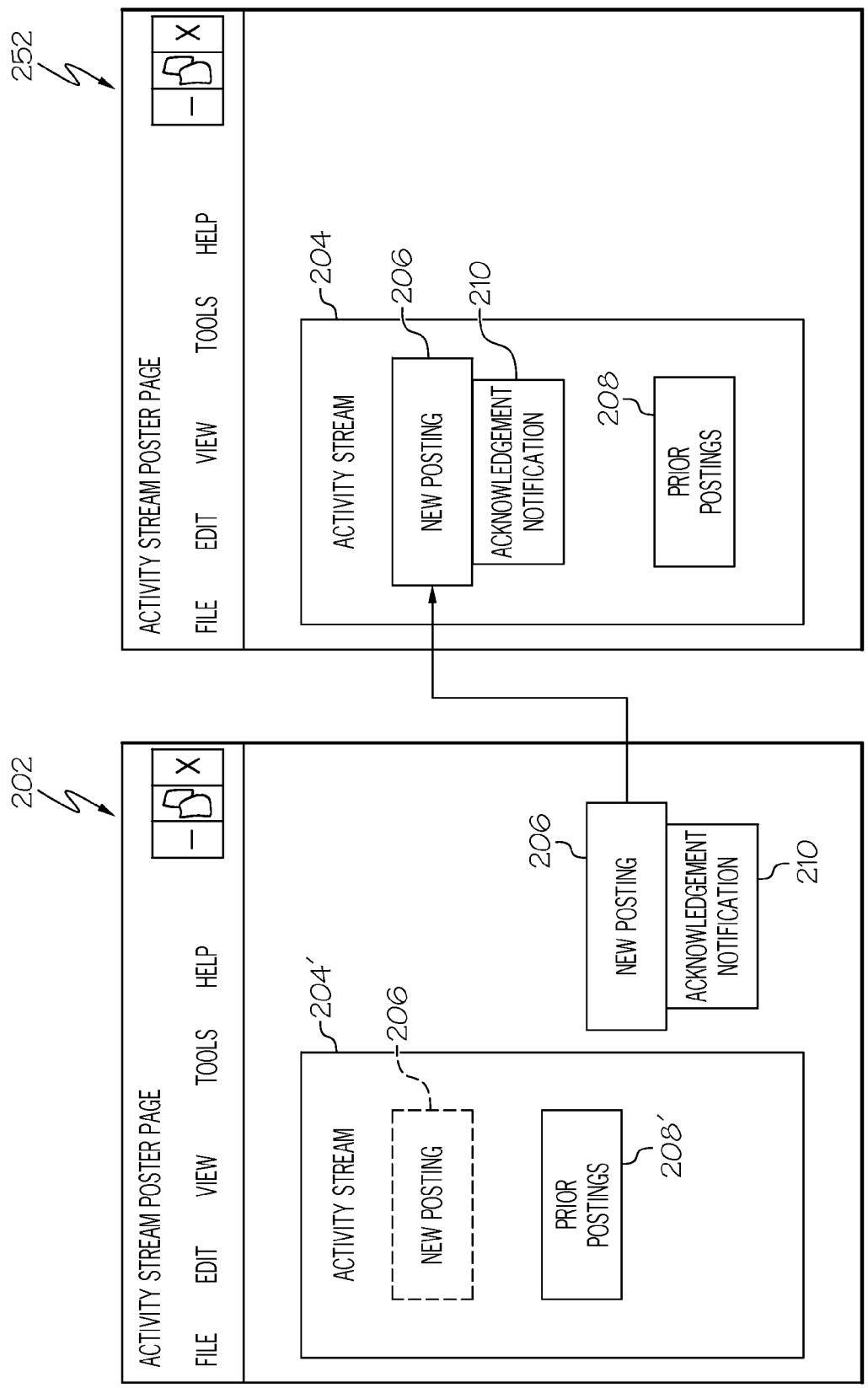
FIG. 2 illustrates an exemplary set of user interfaces for posting a new posting to an activity stream.

With reference now to FIG. 2, an exemplary user interface 202 (e.g., that is displayed on computer 102 depicted in FIG. 1) and a user interface 252 (e.g., that is displayed one or more of the other computers 152 depicted in FIG. 1) are presented. As depicted, user interface 252 includes an activity stream 204. Activity stream 204 is a set of postings related to a topic, person, team, or any other parameter set by a person who initially created the activity stream 204. For example, activity stream 204 may be a set of postings that describe the current state of activities related to a particular work project. In another example, activity stream 204 may be a set of comments related to a particular topic, such as an athletics team, arts and crafts, current events, etc.

As depicted in user interface 202, a user can submit a new posting 206 to be "posted" on the activity stream 204. Thus, the person submitting this new posting 206 can be referred to as a "poster". As depicted, the activity stream 204 may already have prior postings 208. In one embodiment, the newest postings (e.g., new posting 206) are displayed above the prior postings 208, thus indicating which of the postings are the most recent.

As depicted, in one embodiment, the user interface 202 also displays a copy of the activity stream 204, depicted in FIG. 2 as activity stream 204'. Within this activity stream 204' copy are the prior postings (depicted as prior postings 208') as well as the new posting 206 just submitted by the user of user interface 202.

While activity stream 204 is illustrated as having only one new posting 206, the quantity of new postings and prior postings 208 may actually be in the tens, hundreds, or even thousands or more within a single day/week. Thus, the present invention presents a process for providing the user who posted new posting 206 a prediction of the likelihood that one or more viewers of the activity stream 204 will actually see and/or read and/or respond to the new posting 206. That is, the activity stream 204 may be displayed on multiple computers, including the computer that initially created and is now hosting the activity stream 204 (e.g., one of the other computers 152 shown in FIG. 1); the computer that sent the new posting 206 to that computer (e.g., computer 102 shown in FIG. 1); and other computers (from other computers 152 shown in FIG. 1) that also display a latest version of the activity stream 204, whether they submitted a new posting or not. The present invention predicts the likelihood that any authorized viewer, other than the poster of the new posting 206, will actually read the new posting 206. Note that in one embodiment, a person "viewing" a posting is assumed to be "reading" the posting.

Various methods can be used to determine whether or not one or more users actually view new posting 206. These various methods, described below, may be used alone or in combination (of two or more) to determine that one or more users actually viewed new posting 206.

Thus, in one embodiment, an acknowledgement notification 210 is appended to the new posting 206. Acknowledgment notification 210 is an active field (e.g., a flag, box, etc.) that, when clicked or otherwise activated by a viewer, sends a message back to the posting entity that the new posting 206 was actually read.

In another embodiment, the acknowledgement notification 210 is a link to a resource (not shown) such as another webpage, a database, a text file, etc. The posting entity monitors this other resource and, if a "call" to this other resource is made, the posting entity extracts an identity of the entity that called the resource. If the posting entity determines that the call was made by a user of the user interface 252, then an assumption is made that this user read the new posting 206.

In another embodiment, the determination that a user actually read new posting 206 is based on that user performing an activity that is related to new posting 206. For example, assume that the new posting 206 is an invitation to attend a meeting within the next hour. If a user of user interface 252 attends that meeting, then there is an assumption that she read the new posting 206.

In another embodiment, assume that the new posting 206 is a directive to perform some other computer-enabled task, such as removing certain content from an enterprise's webpage. If an identified person removes this certain content, then a computing logic that is monitoring that enterprise's webpage (e.g., either computer 102 or computer 152 shown in FIG. 1) will be able to update a database to indicate who read the new posting 206 and when the new posting 206 was read (e.g., how long after the new posting 206 was posted to the activity stream 204), based on the directed update to the enterprise's webpage.

Any combination of one or more methods for determining that a particular user or group of users actually read a new posting are used both to generate a historical database of viewing habits of that particular user/group, as well as to determine when that particular user/group read a posting such as new posting 206.

Figure 3:
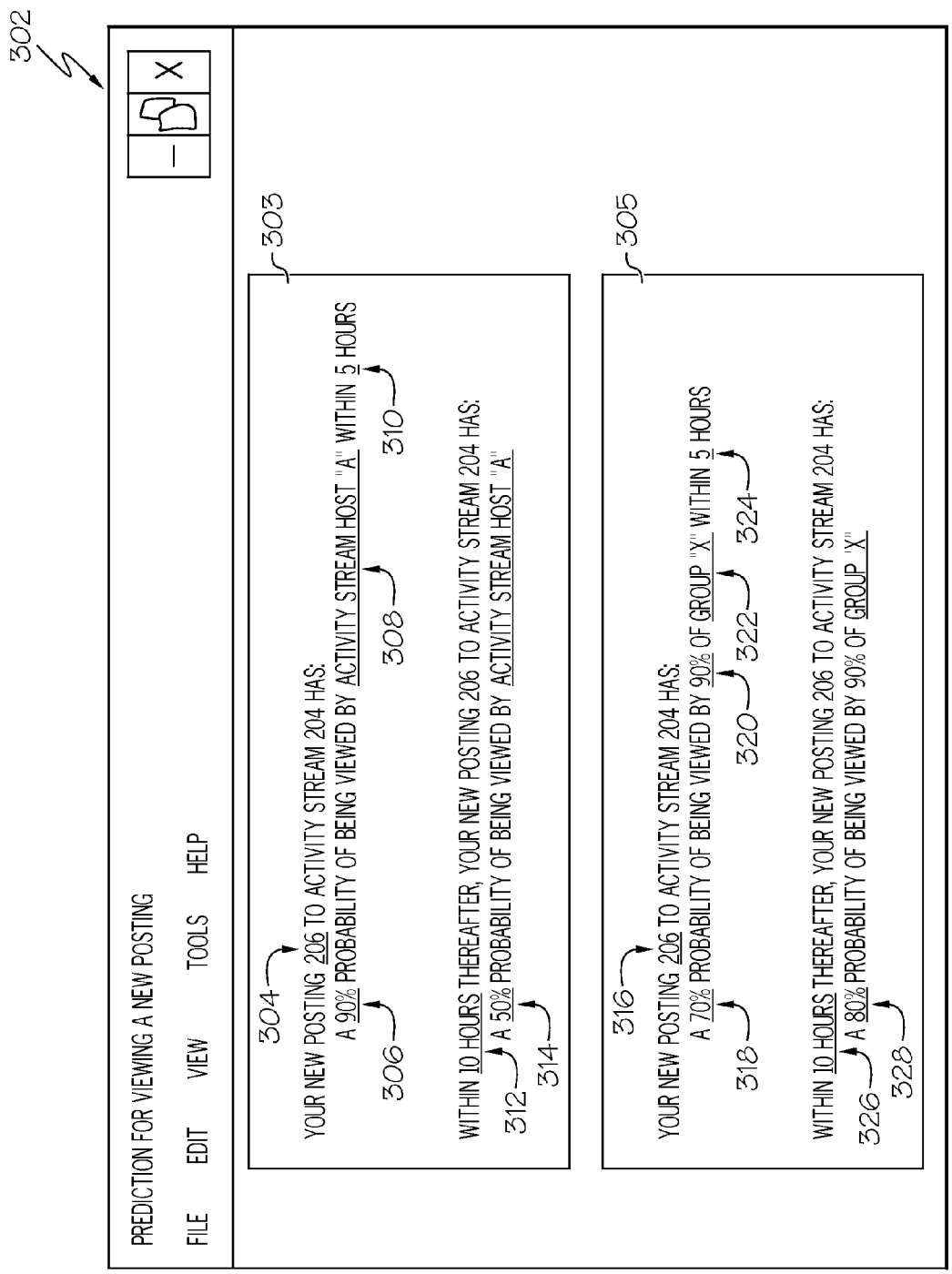
FIG. 3 depicts an exemplary user interface for presenting viewing predictions for a new posting.

As described in FIG. 3, the prediction of if and/or when one or more persons will actually view a new posting is displayed on a user interface 302, which is devoted to presenting predictions for viewing a new posting. These predictions may be for a particular person to view the new posting; for a certain percentage of persons from a group viewing the new posting; for such viewings to be time-based; etc.

For example, consider box 303 from FIG. 3. Based on data mining about potential viewers of a new posting, a prediction is made that new posting 206 (identified in field 304) to activity stream 204 has a 90% probability (identified in field 306) of being viewed by a particular person (e.g., the Activity Stream Host "A" who created the activity stream 204 depicted in FIG. 2, and as identified in field 308) within the next 5 hours (e.g., within 5 hours of when the new posting 206 was posted, or alternatively within 5 hours from the present time, either of which are identified in field 310).

Assume now that historical data shows that there is a "bell curve" for viewing activity, such that more and more persons will view a new posting up to a certain time after being posted, but the number of persons viewing the new posting will then decline thereafter. Thus, box 303 further explains that from 5 hours to 15 hours after the new posting 204 is added to the activity stream 204 (as identified by the field 312 describing the 10 hours after the initial 5 hours), there is now only a 50% probability (identified by field 314) that Activity Stream Host "A" will actually view the new posting 206 (assuming, or course, that he did not do so during the initial 5 hours after the new posting 206 was added to the activity stream).

While box 303 is directed to presenting information regarding the likelihood of a particular person actually viewing the new posting 206, box 305 describes the likelihood of a percentage of persons from a group actually viewing the new posting 206 to activity stream 204, including the likelihood that they will do so within some predefined period after the new posting 206 was added to activity stream 204. For example, assume that Group "X" is a social circle (e.g., a group of friends, co-workers, teammates, etc.) that is defined within the context of a social networking website. Active field 316 identifies new posting 206 as having a 70% (as identified by field 318) probability of being viewed by 90% (see field 320) of the members of Group "X" (see field 323) within 5 hours (see field 324) of being posted to activity stream 204. As with the example shown in box 303, a bell curve of viewing is assumed, such that 10 hours thereafter (see field 326) there is now an 80% probability (see field 328) that new posting 204 to activity stream 204 will be viewed by 90% of Group "X", since the viewings by different members of Group "X" are cumulative (between the initial 5 hours and the subsequent 10 additional hours of viewing opportunity times). That is, even though fewer persons will read the new posting 204 the longer it has been posted, the total number of viewers still increases since these fewer persons are added to the total number of viewers.

Note that while FIG. 3 depicts scenarios in which futuristic predictions are made and displayed (i.e., "a 90% probability of new posting 206 being viewed within 5 hours of being posted to Activity Stream 204"), in one embodiment the prediction is depicted as a real-time event. That is, in one embodiment, a notice is sent to a device (e.g., a smart phone, personal digital assistant, e-mail device, etc.) giving a real-time notice of when a certain event likely occurs. For example, assume that the methodology described herein predicts that new posting 206 will be viewed by Activity Stream Host "A" 90 minutes after being posted to the Activity Stream 204. If new posting 206 was posted at 1:00 PM GMT, and a prediction (based on past viewing history, type of posting, etc.

described herein) is made that new posting 206 will be viewed by Activity Stream Host "A" in 90 minutes, then an e-mail message or other type of alert message is sent to a device at 2:30 PM GMT, stating "New Posting 206 has likely been viewed by Activity Stream Host "A" at 2:30 PM GMT".

With reference now to FIG. 4, a high level flow chart of one or more exemplary steps taken by one or more processors to predict viewing activity of a new posting to an activity stream is presented. After initiator block 402, a new posting is transmitted from a first computer to a second computer, wherein the second computer hosts an activity stream. This new posting, as well as the activity stream, is available to a potential viewer set, which may be a pre-authorized and/or otherwise predefined (e.g., by the creator of the activity stream) particular individual, a group such as a team of co-workers on a project, an enterprise department, a social group, etc. The activity stream is a set of postings that describe a particular topic, project, etc. For example, the activity stream may be a collection of postings (e.g., comments, directives, etc.) about a current event, project status, work activities, etc. These postings come both from the host of the activity stream, as well as from any other authorized person/entity. Thus, the host of the activity stream may start the activity stream with a comment about a particular athletics team's recent performance. The host may then invite certain specified persons/entities (or alternatively, anyone at all), to post their comments (called "postings") to the activity stream. In one embodiment, these new postings, from either the host of the activity stream or other persons/entities, are shown in chronological order, with the most recent postings appearing at the top/bottom of the activity stream.

In one embodiment, the potential viewer set is restricted to persons who are authorized to submit postings to the activity stream. In another embodiment, the potential viewer set is any person designated by the activity stream host as being authorized to view the activity stream. In one embodiment, authorized viewers (i.e., persons who are authorized to view the activity stream) are specifically identified (e.g., members of a particular group, social circle, etc.), while in another embodiment authorized viewers are anybody (i.e., the host has set no restrictions on who may view the activity stream).

In one embodiment, different sets of authorized viewers are authorized to view different sets of postings. For example, in one embodiment, Group "I" is allowed to view postings from any person. However, Group "II" is allowed to view postings only from a group that the host has predefined, such as other members of Group "II". That is, Group "I" can see postings from anybody, while members of Group "II" can only see postings from members of Group "II" itself.

As described in block 406, viewer information about one or more members of the potential viewer set is then identified. In one embodiment, this viewer information is identified by data mining (e.g., looking for predetermined patterns) various databases. Examples of such databases include, but are not limited to, historical databases of actions taken by persons who have interacted with a particular activity stream; records of which social groups, work/project teams, etc. one or more persons belong to; areas of interest of certain persons, as identified by their membership in certain clubs, published writings, etc.; historical databases that describe how many persons of a particular genre (e.g., socio-demographic grouping, workgroup, etc.) have viewed a recent posting to a specific type of activity stream, etc.

For example, assume that a specific person (e.g., Activity Stream Host "A") from the potential viewer set has historically viewed the most recent posting to activity stream 204 within 5 hours 90% of the time. Thus, when a new posting 206 is posted to activity stream 204, a prediction is made that this specific person will view the new posting 206 to activity stream 204 within 5 hours 90% of the time (see box 303 in FIG. 3). Similarly, assume that historical data shows that if this particular person has not viewed a new posting to activity stream 204 within 5 hours of it being posted to activity stream 204, then there is only a 50% probability that this particular person will see the new posting 206 within the next 10 hours (i.e., within a total of 15 hours after the new posting 206 was posted to the activity stream 204). Using this historical data, a prediction can be made that there is only a 50% probability that this person (e.g., Activity Stream Host "A") will see new posting 206 to activity stream 204 within 15 hours of the initial posting of new posting 206. That is, as described in block 408 of FIG. 4, a viewing activity of the new posting 206 by Activity Stream Host "A" is predicted based on the identified viewer information about Activity Stream Host "A". This predicted viewing activity thus describes a predicted likelihood of Activity Stream Host "A" viewing the new posting 206 (in one embodiment, within a predetermined particular period of time) based on Activity Stream Host "A's" viewing history of the activity stream 204.

In another embodiment, assume that there is historical data for the viewing habits of a particular person for an activity stream (i.e., "other activity stream "Z"") that has a same or similar topic, intended audience, etc. as activity stream 204. For example, the other activity stream "Z" and activity stream 204 may both be related to the performance of athletes from a particular athletic genre. That is, the other activity stream "Z" may contain comments about how Player A is performing, while activity stream 204 contains comments about how Player B is performing. An assumption is made that a particular potential viewer (e.g., Activity Stream Host "A") is interested in both Player A and Player B (both of whom may be part of his fantasy league team). In this example, assume that this particular person (e.g., Activity Stream Host "A") from the potential viewer set has historically viewed the most recent posting to the other activity stream "Z" within 5 hours 90% of the time. Thus, when a new posting 206 is posted to activity stream 204, then a prediction is made that this specific person will view the new posting 206 to activity stream 204 within 5 hours 90% of the time (see box 303 in FIG. 3). Similarly, assume that historical data shows that if this particular person has not viewed a new posting to the other activity stream "Z" within 5 hours of it being posted to the other activity stream "Z", then there is only a 50% probability that this particular person will see that new posting to the other activity stream "Z" within the next 10 hours (i.e., within a total of 15 hours after the new posting was posted to the other activity stream "Z"). Using this historical data, a prediction can be made that there is only a 50% probability that this person (e.g., Activity Stream Host "A") will see new posting 206 to activity stream 204 within 15 hours of the initial posting of new posting 206. That is, as still described in block 408 of FIG. 4, a viewing activity of the new posting 206 by Activity Stream Host "A" is predicted based on the identified viewer information about Activity Stream Host "A". This predicted viewing activity thus describes a predicted likelihood of Activity Stream Host "A" viewing the new posting 206 (in one embodiment, within a predetermined particular period of time) based on Activity Stream Host "A's" viewing history of the other activity stream "Z".

With respect again to box 305 in FIG. 3, assume again that there is a desire to know what percentage of persons within a particular group (e.g., Group "X", which may be a project team, a social group, etc.) will actually view new posting 206. Rather than just looking at any single person's past history of viewing new postings to activity stream 204 and/or a similar other activity stream (i.e., another activity stream such as activity stream "Z") about a same topic, activity, etc. as activity stream 204, a historical look at the entire group is performed. For example, assume that the poster of the new posting 206 wants to know the probability of 90% of that team viewing his new posting within 5 hours of it being posted. The poster does not care which 90% of that team views his new posting; only that any 90% of that team views the new posting. Thus, assume that historical data shows that 90% of Group "X" views a new posting to activity stream 204 within 5 hours. That is, on average, any new posting to activity stream 204 was viewed by 90% of the members of Group "X" within 5 hours. Thus, when new posting 206 is added to activity stream 204, a prediction is made that there is a 70% chance of new posting 206 being viewed by 90% of the members of Group "X" within 5 hours. Continuing with the example shown in box 305 in FIG. 3, if 90% of Group "X" has not viewed new posting 206 within the first 5 hours after being posted, then there is an 80% chance that new posting 206 will be viewed within 15 hours of being posted (i.e., the initial 5 hours plus an additional 10 hours thereafter). Again, these predictions can be made with regards to only new postings to activity stream 204, or they can be made with regards to activity stream 204 but by using historical viewing data from other similar activity streams (i.e., activity streams that are related to the same topic, project, group, etc. as activity stream 204). That is, as still described in block 408 of FIG. 4, a viewing activity of the new posting 206 by 90% of Group "X" is predicted based on the identified viewer information about Group "X". This predicted viewing activity thus describes a predicted likelihood of 90% of Group "X" viewing the new posting 206 (in one embodiment, within a predetermined particular period of time) based on 90% of Group "X's" viewing history of the activity stream 204 (or alternatively, of a similar activity stream as described herein).

As described in block 410 of FIG. 4, the predicted viewing activity of the new posting by the potential viewer set (i.e., one or more authorized viewers from the potential viewer set) is then presented on a display on the first computer (e.g., as depicted in FIG. 2). The process ends at terminator block 412.

Predicting whether one or more persons will view a particular new posting on an activity stream can be based (at least in part) on how "busy" the activity stream is. That is, if an activity stream receives 10 new postings a day, there is a greater likelihood that any one of those 10 new postings will be viewed than if that activity stream receives 1000 new postings per day. Thus, in one embodiment of the present invention, one or more processors determines (by monitoring posting activity to a particular activity stream) that the particular activity stream (e.g., in the second computer that received the new posting) receives more than a predetermined number of new postings during a particular period of time. In response to determining that the new postings to that particular activity stream exceed the predetermined number during the particular period of time, then the processor(s) reduce the predicted likelihood of the potential viewer(s) viewing the new posting. This prediction can be achieved/calculated with or without consulting historical viewing data of new postings by the potential viewer(s), since just the high quantity of new postings to the activity stream is enough to deem the viewing of any particular new posting less likely.

As described herein, the likelihood of a single person viewing a new posting may decrease over time, while the likelihood of multiple persons viewing a new posting may increase over time. That is, if a single person does not view a new posting within a certain amount of time (e.g., 5 hours), then the odds of that person viewing the new posting may go down, due to newly-arriving postings pushing the older new posting down the stack, etc. However, if a total number of viewers are being sought after (e.g., the poster would like to know if/when 90% of a group views her new posting), then the odds that this 90% target will be reached increase over time, since there is always a chance that some of the remaining non-viewers will eventually read her new posting.

Thus, in one embodiment, where the potential viewer set consists of a single member, the method further comprises determining, by one or more processors, that a predefined period of time (e.g., 5 hours) has passed since the new posting has been posted to the activity stream in the second computer. However, now, in response to determining that the predefined period of time has passed since the new posting has been posted to the activity stream in the second computer, one or more processors reduces the predicted likelihood of the potential viewer set viewing the new posting.

However, in another embodiment, where the potential viewer set consists of multiple viewers, the method further comprises determining, by one or more processors, that a predefined period of time (e.g., 5 hours) has passed since the new posting has been posted to the activity stream in the second computer. In response to determining that the predefined period of time has passed since the new posting has been posted to the activity stream in the second computer, one or more processors then lowers/reduces/lessens the predicted likelihood of the potential viewer set (i.e., of multiple viewers) viewing the new posting.

In one embodiment of the present invention, if a particular user has previously demonstrated an interest in a particular subject matter (e.g., is a member of a group devoted to predicting weekly athletic teams (i.e., a "fantasy league"), or is a member of a group devoted to a particular issue, etc.), then there is an increased likelihood that this user will actually read a new posting that is related to this subject matter. That is, a computer can data mine a database to identify what groups, writings, etc. are attributable to or accessed by a particular person. For example, such data mining can indicate that this person is interested in fantasy leagues. This interest identifier is then added to a profile in a database about that person. Thus, if a new posting to an activity stream is about fantasy leagues, a match is made to this person's profile database, and the predicted likelihood of that person actually reading this new posting will be increased. Thus, in this embodiment, one or more processors determine that (one or more) members of the potential viewer set have previously demonstrated an interest in a subject matter of the new posting. In response to determining that members of the potential viewer set have previously demonstrated the interest in the subject matter of the new posting, one or more processors increase the predicted likelihood of the potential viewer set viewing the new posting.

In one embodiment of the present invention, the new posting may provide the opportunity to the reader to initiate a computer-implemented response, such as clicking a "I have read this" flag, clicking a hyperlink to another resource such as another webpage, database, text/video file, etc., taking an action such as signing up to volunteer for a particular task such as bringing refreshments to a meeting, attending a meeting, etc. If a particular person or group of persons has a history of taking such actions (as determined by data mining databases and other resources that identify who took such actions, including in response to a posting to an activity stream), then there is an implied interest in new postings that are similar to those that prompted the prior actions by that person. That is, if a particular person has a consistent history of volunteering to bring refreshments to a meeting when asked to do in a posting to an activity stream (e.g., does so 90% of the time when such a posting is sent to this person), then there is a strong likelihood that this person will 1) read a similar posting about bringing refreshments to a meeting, and/or 2) will bring such refreshments. Thus, in this embodiment, one or more processors determine that members of the potential viewer set (i.e., one or more persons) have previously initiated a computer-implemented response (e.g., sending a message/posting to the activity stream stating "I will bring refreshments to the next meeting") to prior postings that share a subject matter of the new posting. In response to determining that members of the potential viewer set have previously initiated the computer-implemented response to prior postings that share the subject matter of the new posting, then the processor(s) increase the predicted likelihood of the potential viewer set 1) viewing the new posting, and/or 2) initiating the computer-implemented response (e.g., sending the message/posting to the activity stream stating "I will bring refreshments to the next meeting", clicking to another resource, etc.), and/or 3) actually performing the indicated activity (e.g., attending the meeting, bringing refreshments, etc.).

In one embodiment of the present invention, if a prediction is made that a particular person (or fewer than some predetermined number of persons) will not read a new posting (e.g., with a certain level of confidence or within a predetermined amount of time), a message is sent to the poster of that new posting to repost the new posting to the activity stream. For example, assume that poster "I" posts her new posting to an activity stream. However, the process described herein determines that there is less than a 70% chance that a particular person/group will read this new posting (either at any time in the future or within the next 10 hours). Based on this message, the system will 1) automatically repost the new posting to the activity stream, 2) send a warning to the poster (that the new posting is unlikely to be seen and/or that it has been reposted), and/or 3) adjust the image of the new posting. With respect to the third 3) option, the new posting may be visually coded (e.g., adjusted to be displayed with a larger font, bold font, color coded, flashing display, etc.) in order to increase the likelihood that viewers of the activity stream will actually see and/or read this new posting.

In one embodiment of the present invention, predicting when and if a particular person or group (including group percentage) reads a particular new posting to an activity stream is based on real-time and/or historical data (e.g., obtained from a database of reading histories of activity streams by one or more particular persons or types of persons) related to reading non-contiguous postings. For example, assume that monitoring of a particular activity stream reveals (e.g., by detected interactions, "Have Read" flags, etc.) that a certain person has read the first, third, and fifth postings to that particular activity stream. The present system will thus assume that the second and fourth postings were also read, based on an assumption derived from known reading habits of all persons and/or the certain person of interest. If the second or fourth posting was for the new posting of interest, then a prediction/notice is made using the methodology described herein.

In one embodiment, of the present invention, if a user reads any posting on a page, a prediction is made that this same user has/will read all postings on that page. In one embodiment, a page holds an entire activity stream. In another embodiment, the entire activity stream must be presented on multiple pages. In either embodiment, if the user has interacted with any of the posts on a particular page, then an assumption is made that all posts on that particular page have been (or will be) read by that user. Alternatively, if the user has not interacted with any of the posts on a particular page, then an assumption is inferred that the user has not read any posts on that page. Thus, a first user that interacted with posts on the particular page/activity stream is deemed likely to interact with new postings, while a second user that historically has not interacted with posts on the particular page/activity stream will be deemed likely to interact with new postings on that particular page/activity stream.

Note that the flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Having thus described embodiments of the invention of the present application in detail and by reference to illustrative embodiments thereof, it will be apparent that modifications and variations are possible without departing from the scope of the invention defined in the appended claims.

What is claimed is:

1. A method of predicting viewing activity of a new posting to an activity stream, the method comprising:
    transmitting, from a first computer to a second computer, a new posting to an activity stream in the second computer, wherein the new posting is available for viewing to a potential viewer set;
    identifying, by one or more processors, viewer information about one or more members of the potential viewer set;
    predicting, by one or more processors, a viewing activity of the new posting by the potential viewer set, wherein a predicted viewing activity is based on identified viewer information about said one or more members of the potential viewer set, and wherein the predicted viewing activity describes a predicted likelihood of the potential viewer set viewing the new posting;
    presenting, on a display coupled to the first computer, the predicted viewing activity of the new posting by the potential viewer set;
    determining, by one or more processors, that the activity stream in the second computer receives more than a predetermined number of new postings during a particular period of time; and
    in response to determining that the new postings exceed the predetermined number during the particular period of time, reducing, by one or more processors, the predicted likelihood of the potential viewer set viewing the new posting.

2. The method of claim 1, wherein the potential viewer set consists of multiple viewers, and wherein the method further comprises:
    determining, by one or more processors, that a predefined period of time has passed since the new posting has been posted to the activity stream in the second computer; and
    in response to determining that the predefined period of time has passed since the new posting has been posted to the activity stream in the second computer, decreasing, by one or more processors, the predicted likelihood of the potential viewer set viewing the new posting.

3. The method of claim 1, wherein the potential viewer set consists of a single member, and wherein the method further comprises:
    determining, by one or more processors, that a predefined period of time has passed since the new posting has been posted to the activity stream in the second computer; and
    in response to determining that the predefined period of time has passed since the new posting has been posted to the activity stream in the second computer, reducing, by one or more processors, the predicted likelihood of the potential viewer set viewing the new posting.

4. The method of claim 1, further comprising:
    determining, by one or more processors, that members of the potential viewer set have previously demonstrated an interest in a subject matter of the new posting; and
    in response to determining that members of the potential viewer set have previously demonstrated the interest in the subject matter of the new posting, increasing, by one or more processors, the predicted likelihood of the potential viewer set viewing the new posting.

5. The method of claim 1, further comprising:
    determining, by one or more processors, that members of the potential viewer set have previously initiated a computer-implemented response to prior postings that share a subject matter of the new posting; and
    in response to determining that members of the potential viewer set have previously initiated the computer-implemented response to prior postings that share the subject matter of the new posting, increasing, by one or more processors, the predicted likelihood of the potential viewer set viewing the new posting.

6. The method of claim 1, further comprising:
    determining, by one or more processors, that members of the potential viewer set have previously initiated a computer-implemented response to prior postings that share a subject matter with the new posting; and
    in response to determining that members of the potential viewer set have previously initiated the computer-implemented response to prior postings that share the subject matter of the new posting, predicting, by one or more processors, that the potential viewer set will initiate the computer-implemented response in response to viewing the new posting.

7. The method of claim 1, further comprising:
    determining, by one or more processors, that the predicted viewing activity is below a predetermined level;
    in response to determining that the predicted viewing activity is below the predetermined level, adjusting, by one or more processors, a visual appearance of the new posting to create a visually adjusted new posting; and
    reposting, by one or more processors, the visually adjusted new posting to the activity stream.

* * * * *